Oct. 21, 1958

D. F. DICKEY 2,857,155

APPARATUS FOR REDUCING ORES

Filed Oct. 4, 1952

INVENTOR.
David F. Dickey

BY
HIS ATTORNEYS

United States Patent Office 2,857,155
Patented Oct. 21, 1958

2,857,155

APPARATUS FOR REDUCING ORES

David F. Dickey, Whitehall Borough, Pa., assignor, by mesne assignments, to Electrolyser Corporation, Ltd., Toronto, Ontario, Canada, a corporation of Canada Application October 4, 1952, Serial No. 313,137

2 Claims. (Cl. 266—25)

This invention relates to an apparatus for reducing ores and the like. It will be described particularly as applied to the reduction of iron ore to produce iron powder, but it may be employed for the reduction of other ores or metal oxides to metal powder. Iron powder produced according to my invention can be pressed into various objects or it can be mixed with a carbonaceous binder and briquetted and then used as a charge which is melted to produce various iron and steel products.

In the accompanying drawings which illustrate a preferred embodiment of my invention—

Figure 1:
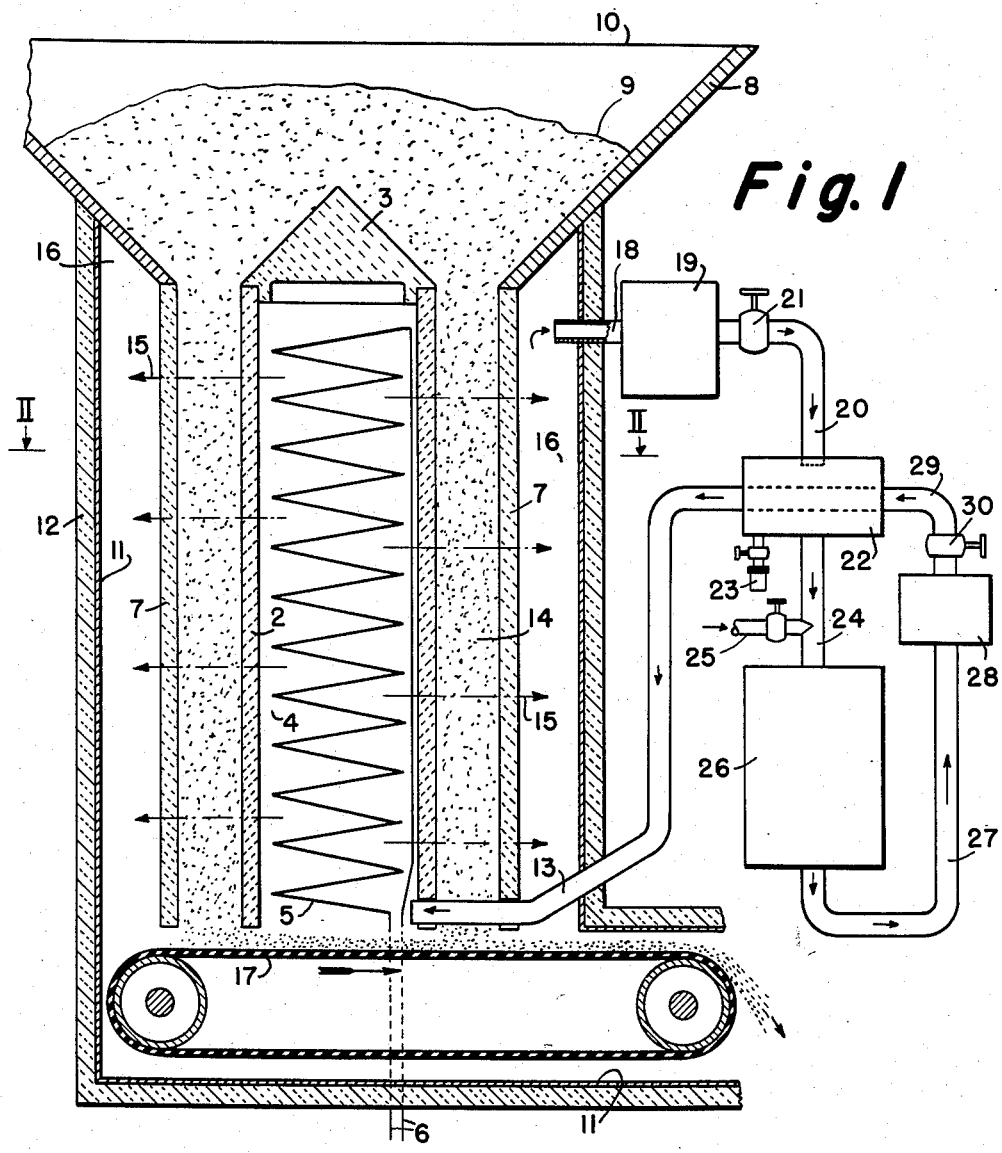
Figure 2:
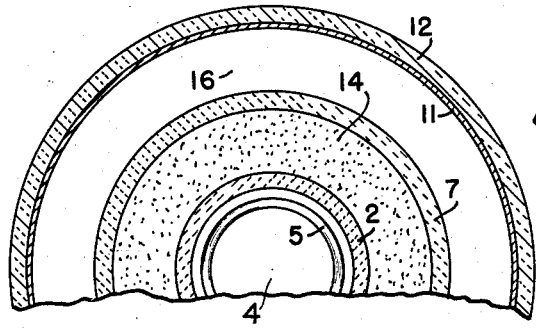

Figure 1 is longitudinal, vertical section through the reduction furnace, the view also showing means for withdrawing spent reducing gas from the furnace, purifying and otherwise treating it and returning it to the furnace; and Figure 2 is a transverse section taken on the line II—II of Figure 1.

The invention relates to an apparatus for the direct reduction of ores or other metal oxides, i. e., to reduction of ores without melting the ore. In carrying out the invention, the ore in finely powdered form is heated to a suitable temperature and is reduced with hydrogen, carbon monoxide, or other suitable reducing gas.

Various processes are known for the direct reduction of ores using reducing gas, but these have not proved to be entirely satisfactory. In one known method, iron ore is fed downwardly from a closed receiver through a plurality of spaced concentric gas-tight metal tubes which are externally heated. As the ore passes downwardly lengthwise through the tubes, reducing gas passes upwardly through the tubes. This method has several disadvantages. The ore in the tubes offers considerable resistance to the passage of reducing gas therethrough so that a relatively high gas pressure is required in order to produce a given rate of flow through the ore. Since rate of flow of reducing gas through the ore is a material factor in determining the speed of the reducing reaction, it is evident that, for any given gas pressure employed, the rate of reaction is considerably reduced as compared with a method in which less resistance is offered to the flow of reducing gas.

The reducing gas in passing through the ore becomes contaminated with water or other impurities. Accordingly, in the known method, the reducing gas is less pure at the top of the tubes than at the bottom where it is introduced. Therefore, the reducing action of the gas on the ore adjacent the top of the tubes is less rapid than it is adjacent the bottom of the tubes.

These disadvantages of prior known apparatus are overcome or minimized in accordance with my invention. Referring more particularly to the accompanying drawing, my reduction furnace comprises an inner refractory porous tube 2 made of aluminum oxide and sold under the trade-name "Alundum," or of other suitable porous refractory material. This tube must be porous enough to allow the passage of reducing gas therethrough but prevent the passage of finely divided ore. The tube 2 is open at its bottom but is closed at its top by a refractory cap 3 so as to provide a heating chamber 4, in which is located an electric resistance heater 5 connected by conductors 6 to a source of electric current not shown. An outer refractory porous tube 7, preferably made of "Alundum," is spaced from the inner tube 2 a small distance and surrounds the inner tube. The outer tube 7 is open at its bottom and at its top, and is connected at its top to a hopper 8 into which finely divided iron ore 9 may be fed through its open top 10. The iron ore preferably has a particle size of minus 200 mesh. A gas-tight metal casing 11 provided with a heat insulating layer 12 on its outer surface is spaced from and surrounds the outer refractory porous tube 7. Hydrogen or other reducing gas is introduced into the bottom of the heating chamber 4 through a pipe 13.

My apparatus for reducing iron ore or other metal oxide may be used as follows.

Finely divided iron ore 9 is introduced into the hopper 8 through its top 10 and flows downwardly from the hopper through the annular passage 14 provided between the porous inner tube 2 and the porous outer tube 7. Dry hydrogen or other reducing gas is introduced through the pipe 13 into the heating chamber 4 at a point adjacent the bottom of the heating chamber. The hydrogen flows upwardly in the heating chamber in contact with the electric heater 5, thereby heating the reducing gas to a suitable temperature, preferably about 1100° F. As the iron ore flows downwardly in the annular passage 14, the reducing gas flows transversely as indicated by the arrows 15 from the heating chamber 4 through the inner tube 2, the thin layer of iron ore in the annular passage 14, and then through the outer tube 7 into the chamber 16 defined by the casing 11 and outer tube 7, thereby becoming contaminated with water. The iron powder formed by reducing the ore falls from the bottom of the annular passage 14 onto a conveyor 17 which also is located within the confines of the gas-tight casing 11, and the iron powder is discharged from the conveyor into a briquetting chamber, not shown, where the iron powder is mixed with carbon and briquetted.

The hydrogen gas, after having passed once only through the ore in the annular passage 14 into the chamber 16 and having been contaminated with water, flows directly through a pipe 18 into a gas analyzer 19 in which its pressure, temperature, hydrogen and water contents are determined. It then passes through a pipe 20 controlled by a valve 21 to a heat exchanger 22 where it is cooled to condense water which is collected in a condensate trap 23.

The hydrogen gas then flows through a pipe 24 to which pipe 25 is connected for supplying additional hydrogen to make up for that which is lost in the process. The hydrogen then passes through a drier 26, pipe 27, to a compressor 28 from which it flows through pipe 29 controlled by valve 30, to heat exchanger 22, and returns through pipe 13 to the heating chamber 4.

In carrying out the invention, the height of the charge of iron ore in the hopper 8 is maintained sufficient to act as a seal for preventing escape of hydrogen upwardly through the charge in the hopper and to cause the hydrogen in the annular passage 14 to flow transversely through the annular passage as indicated by the arrows 15 so as to be received in the gas collecting chamber 16. In this manner, a hopper having an open top 10 may be employed so that a charge of ore may be readily introduced into the hopper from a conveyor or charging bucket not shown.

It will be seen that according to my invention, the reducing gas flows transversely through a relatively thin layer of ore in the annular passage 14. In the embodiment shown, the inner and outer tubes 2 and 7 are spaced from each other a distance of about 2", the length of each of the tubes being about 20". While these dimensions may be varied, the distance between the tubes 2 and 7 should always be substantially less than the length of the tubes so that the reducing gas has only a relatively short distance to travel through the ore, as compared with the length of the tubes. In this manner, the resistance of the ore to the passage of reducing gas through it, is relatively small as compared with the case where the gas flows lengthwise through the tubes. Accordingly, a greater volume of reducing gas can be passed through the ore for any given pressure of gas than could be obtained if the gas passed lengthwise through the tubes. The increase in volume of the gas for a given pressure greatly increases the rapidity of the reducing action.

Another advantage of my reduction furnace is that the heater 5 is centrally located and surrounded by the ore in passage 14 so that all heat supplied by the heater must pass through the ore and do useful work before there is any opportunity for radiation losses from the furnace.

The invention is not limited to the preferred embodiment, but may be otherwise embodied or practiced within the scope of the following claims.

I claim:

1. An ore reduction apparatus comprising an inner refractory porous tube closed at its top and forming an inner chamber, an outer refractory porous tube surrounding and spaced from said inner tube a distance less than the height of either of said tubes and forming with said inner tube an annular ore treating chamber, said inner and outer refractory porous tubes having such porosity as to allow passage therethrough of reducing gas but to prevent passage therethrough of ore having a particle size of minus 200 mesh, said outer tube being open at its top and bottom, a hopper located above said tubes and connected to said outer tube for feeding ore from the hopper into said ore treating chamber, a gas-tight casing surrounding and spaced from said outer tube and forming therewith a gas collecting chamber, and means for introducing reducing gas under pressure into said inner chamber, said gas collecting chamber having a gas outlet leading directly from the ore reduction apparatus so that the gas after it has passed once only transversely through the ore as the ore passes downwardly through said annular ore treating chamber and the gas has passed into said collecting chamber and has been contaminated flows directly through the gas outlet of said gas collecting chamber.

2. An ore reduction apparatus according to claim 1, wherein the hopper has an open top.

References Cited in the file of this patent
UNITED STATES PATENTS

| | | |
|---|---|---|
| 1,213,470 | Finlay | Jan. 23, 1917 |
| 1,304,755 | Ellis | May 27, 1919 |
| 1,832,731 | Pardee | Nov. 17, 1931 |
| 1,895,284 | Hay | Jan. 24, 1933 |
| 1,989,072 | Billinghurst | Jan. 29, 1935 |
| 1,995,293 | Clark | Mar. 26, 1935 |
| 2,236,474 | Hardy | Mar. 25, 1941 |
| 2,559,419 | Fouquet | July 3, 1951 |

FOREIGN PATENTS

| | | |
|---|---|---|
| 839,891 | France | Jan. 7, 1939 |